US012300190B2

(12) United States Patent
Wei et al.

(10) Patent No.: US 12,300,190 B2
(45) Date of Patent: May 13, 2025

(54) DRIVING METHOD OF DISPLAY PANEL, DRIVING CIRCUIT OF DISPLAY PANEL, DRIVING CHIP OF DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Chongguang Wei, Beijing (CN); Weifan Yang, Beijing (CN); Lu Ding, Beijing (CN); Linlin Wang, Beijing (CN); Bo Feng, Beijing (CN); Xiaofeng Yin, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/247,423

(22) PCT Filed: Jun. 17, 2022

(86) PCT No.: PCT/CN2022/099392
§ 371 (c)(1),
(2) Date: Mar. 30, 2023

(87) PCT Pub. No.: WO2023/240586
PCT Pub. Date: Dec. 21, 2023

(65) Prior Publication Data
US 2024/0371335 A1 Nov. 7, 2024

(51) Int. Cl.
*G09G 3/36* (2006.01)

(52) U.S. Cl.
CPC ......... *G09G 3/3607* (2013.01); *G09G 3/3614* (2013.01); *G09G 2300/0823* (2013.01); *G09G 2330/02* (2013.01)

(58) Field of Classification Search
CPC .......................... G09G 3/3607; G09G 2330/02
See application file for complete search history.

(56) References Cited

U.S. PATENT DOCUMENTS 5,892,493 A * 4/1999 Enami .................. G09G 3/3688 345/94
6,266,039 B1 * 7/2001 Aoki .................... G09G 3/3611 345/94
(Continued)

FOREIGN PATENT DOCUMENTS

CN 102487240 A 6/2012
CN 103676256 A 3/2014
(Continued)

OTHER PUBLICATIONS

Behzad Razavi, "High conversion rate operational amplifier", Design of Analog CMOS Integrated Circuits (Second Edition), Dec. 2018 (Dec. 2018), pp. 355-356, vol. 10, No. 0, Xi'an Jiaotong University Press, Xi'an, China.
(Continued)

*Primary Examiner* — David Tung
(74) *Attorney, Agent, or Firm* — Kinney & Lange, P.A.

(57) ABSTRACT

Provided is a driving method of a display panel, which relates to a field of a display technology. The display panel includes a pixel array, the pixel array comprises a plurality of rows of sub-pixels, and the driving method includes: driving, in a same display frame, different sub-pixels in a row of the sub-pixels respectively by a forward driving signal and a negative driving signal, wherein a voltage conversion rate of the forward driving signal is greater than a voltage conversion rate of the negative driving signal
(Continued)

under a same display gray scale. A driving circuit, a driving chip and a display device are further provided.

18 Claims, 10 Drawing Sheets

(56) References Cited

U.S. PATENT DOCUMENTS

| | | | | |
|---|---|---|---|---|
| 9,542,898 | B2 | 1/2017 | Feng et al. | |
| 11,120,724 | B2 | 9/2021 | Kim | |
| 11,120,755 | B2 | 9/2021 | Kang | |
| 2002/0171640 | A1* | 11/2002 | Bu | G09G 3/3611 345/208 |
| 2005/0062508 | A1* | 3/2005 | Nishimura | H03K 17/04163 327/112 |
| 2008/0174462 | A1* | 7/2008 | Tsuchi | G09G 3/3614 327/108 |
| 2009/0009498 | A1* | 1/2009 | Nishimura | G09G 3/3688 345/205 |
| 2010/0134473 | A1* | 6/2010 | Matsuda | G09G 3/3677 345/94 |
| 2015/0123961 | A1* | 5/2015 | Park | G09G 3/3614 345/212 |
| 2016/0293123 | A1 | 10/2016 | Feng et al. | |
| 2018/0240423 | A1 | 8/2018 | Park et al. | |
| 2019/0378471 | A1 | 12/2019 | Lee et al. | |
| 2021/0012730 | A1 | 1/2021 | Kang | |
| 2021/0201740 | A1 | 7/2021 | Kim | |
| 2022/0328016 | A1 | 10/2022 | Wang et al. | |

FOREIGN PATENT DOCUMENTS

| | | | |
|---|---|---|---|
| CN | 109671410 | A | 4/2019 |
| CN | 111261125 | A | 6/2020 |
| CN | 113129798 | A | 7/2021 |
| CN | 114038438 | A | 2/2022 |
| JP | 2001343944 | A | 12/2001 |

OTHER PUBLICATIONS

International Search Report and Written Opinion dated Mar. 9, 2023, for corresponding PCT Application No. PCT/CN2022/099392.

Shi Yang et al., "PGA102 Digital Programmed Gain Operational Amplifier", Burr-Brown Linear IC and Application Handbook, May 1988 (May 1988), pp. 62-65, vol. 1.31, No. 1, Guangming Daily Publishing House, Shanghai, China.

* cited by examiner

DRIVING METHOD OF DISPLAY PANEL, DRIVING CIRCUIT OF DISPLAY PANEL, DRIVING CHIP OF DISPLAY PANEL AND DISPLAY DEVICE

CROSS-REFERENCE TO RELATED APPLICATION

This application is a Section 371 National Stage Application of International Application No. PCT/CN2022/099392, filed on Jun. 17, 2022, entitled "DRIVING METHOD OF DISPLAY PANEL, DRIVING CIRCUIT OF DISPLAY PANEL, DRIVING CHIP OF DISPLAY PANEL AND DISPLAY DEVICE", the content of which is hereby incorporated by reference in its entirety.

TECHNICAL FIELD

The present disclosure relates to a field of a display technology, and in particular, to a driving method of a display panel, a driving circuit of a display panel, a driving chip of a display panel, and a display device.

BACKGROUND

Liquid Crystal Display (LCD) is a display driven by a stable voltage. For the liquid crystal display, especially for an e-sports display, an improvement of a refresh rate is an important measure to improve a performance of the liquid crystal display. However, the improvement of the refresh rate may lead to a shorter charging time of pixels, resulting in an unstable voltage of a driving display, which may cause a residual image on a display screen of the LCD and affect a display effect.

SUMMARY

The present disclosure provides a driving method of a display panel, a driving circuit of a display panel, a driving chip of a display panel and a display device.

According to a first aspect, the present disclosure provides a driving method of a display panel, wherein the display panel includes a pixel array, the pixel array includes a plurality of rows of sub-pixels, and the driving method includes: driving, in a same display frame, different sub-pixels in a row of the sub-pixels respectively by a forward driving signal and a negative driving signal, wherein a voltage conversion rate of the forward driving signal is greater than a voltage conversion rate of the negative driving signal under a same display gray scale.

For example, a rise time of the forward driving signal is less than a rise time of the negative driving signal; wherein the rise time of the forward driving signal characterizes a rise time required for the forward driving signal to rise from a first voltage to a second voltage, and the rise time of the negative driving signal characterizes a rise time required for the negative driving signal to rise from a third voltage to a fourth voltage.

For example, a ratio between the rise time of the forward driving signal and the rise time of the negative driving signal is in a range of 0.25 to 0.4.

For example, a fall time of the forward driving signal is greater than a fall time of the negative driving signal; wherein the fall time of the forward driving signal characterizes a fall time required for the forward driving signal to fall from a second voltage to a first voltage, and the fall time of the negative driving signal characterizes a fall time required for the negative driving signal to fall from a fourth voltage to a third voltage.

For example, a ratio between the fall time of the forward driving signal and the fall time of the negative driving signal is in a range of 1.16 to 1.34.

For example, a ratio between a voltage difference from the first voltage to a forward driving signal trough voltage and a voltage difference from a forward driving signal crest voltage to the forward driving signal trough voltage is in a range of 5% to 10%, and a ratio between a voltage difference from the second voltage to the forward driving signal trough voltage and the voltage difference from the forward driving signal crest voltage to the forward driving signal trough voltage is in a range of 90% to 95%; and a ratio between a voltage difference from the third voltage to a negative driving signal trough voltage and a voltage difference from a negative driving signal crest voltage to the negative driving signal trough voltage is in a range of 5% to 10%, and a ratio between a voltage difference from the fourth voltage to the negative driving signal trough voltage and the voltage difference from the negative driving signal crest voltage to the negative driving signal trough voltage is in a range of 90% to 95%.

For example, a sum of the rise time of the forward driving signal and a fall time of the forward driving signal is less than a sum of the rise time of the negative driving signal and a fall time of the negative driving signal.

For example, the driving different sub-pixels in a row of the sub-pixels respectively by a forward driving signal and a negative driving signal includes: receiving, in a process of driving a row of the sub-pixels, the forward driving signal and the negative driving signal respectively by the sub-pixels adjacent to each other in a row direction.

For example, the display panel further includes a data line, and the forward driving signal and/or the negative driving signal provides a driving signal for the sub-pixel through the data line, and in a same display frame, a same data line receives only the forward driving signal or the negative driving signal.

For example, a forward driving gear of the forward driving signal is greater than a negative driving gear of the negative driving signal; wherein the forward driving gear characterizes a rate at which the forward driving signal rises from a first voltage to a second voltage, and the negative driving gear characterizes a rate at which the negative driving signal rises from a third voltage to a fourth voltage.

According to a second aspect, the present disclosure provides a driving circuit of a display panel for the driving method according to embodiments of the present disclosure, wherein the driving circuit is configured to drive a pixel array, the pixel array includes a plurality of sub-pixels, and the driving circuit includes: a driving signal generation sub-circuit configured to generate a forward driving signal and a negative driving signal; and a driving signal gating sub-circuit configured to gate the forward driving signal and the negative driving signal, so that in a same display frame, the forward driving signal and the negative driving signal respectively drive different sub-pixels in a row of the sub-pixels, and a voltage conversion rate of the forward driving signal is greater than a voltage conversion rate of the negative driving signal.

For example, the display panel further includes 2N data lines; the driving signal gating sub-circuit includes N driving signal gating sub-circuits, where N is a positive integer; wherein the driving signal gating sub-circuit includes two output ends respectively electrically connected to two data lines, and the two output ends respectively output the forward driving signal and the negative driving signal, so as to drive sub-pixel units connected to the data lines.

For example, the driving signal generation sub-circuit includes: a positive frame amplification unit electrically connected to a data signal end to receive a data signal from the data signal end, wherein the positive frame amplification unit is configured to output the forward driving signal; and a negative frame amplification unit electrically connected to the data signal end to receive a data signal from the data signal end, wherein the negative frame amplification unit is configured to output the negative driving signal.

For example, the positive frame amplification unit includes: a positive frame operational amplifier electrically connected to the data signal end; and a first transistor array electrically connected between an output end of the positive frame amplifier and the driving signal gating sub-circuit.

For example, the negative frame amplification unit includes: a negative frame operational amplifier having an input end electrically connected to the data signal end; and a second transistor array electrically connected between the output end of the positive frame amplifier and the driving signal gating sub-circuit.

For example, the driving circuit further includes: a first power supply electrically connected to the first transistor array and configured to output a first power supply voltage; and a second power supply electrically connected to the second transistor array and configured to output a second power supply voltage, wherein the first power supply voltage is 2 times of the second power supply voltage.

According to a third aspect, the present disclosure provides a driving chip of a display panel, wherein the driving chip is configured to provide a forward driving signal and a negative driving signal to the display panel, and a voltage conversion rate of the forward driving signal is greater than a voltage conversion rate of the negative driving signal.

According to a fourth aspect, the present disclosure provides a display device, including a pixel array and the driving circuit according to embodiments of the present disclosure.

For example, the display device further includes: a plurality of data lines, the driving circuit includes a plurality of data lines, wherein the driving circuit includes a plurality of output ends, and the plurality of data lines are connected to the plurality of output ends, respectively.

DETAILED DESCRIPTION OF EMBODIMENTS

Figure 1A:
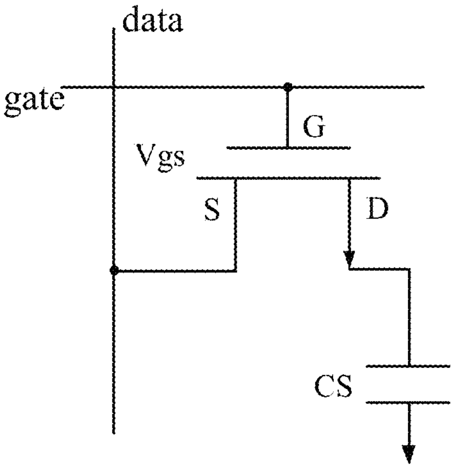
FIG. 1A shows a schematic diagram of a transistor unit according to an example.

In order to make objectives, technical solutions and advantages of the present disclosure clearer, the technical solutions in embodiments of the present disclosure will be described clearly and completely in combination with accompanying drawings in embodiments of the present disclosure. Obviously, the described embodiments are some, but not all of embodiments of the present disclosure. Based on the described embodiments of the present disclosure, all other embodiments obtained by those skilled in the art without any creative work fall within the scope of protection of the present disclosure. It should be noted that throughout the accompanying drawings, the same elements are indicated by the same or similar reference numerals. In the following descriptions, some specific embodiments are only used for the purpose of description, and should not be construed as limiting the present disclosure, but as examples of embodiments of the present disclosure. When it may cause confusion in the understanding of the present disclosure, conventional structures or configurations may be omitted. It should be noted that the shapes and dimensions of components in the drawings do not necessarily reflect actual sizes and/or ratios, but merely illustrate the contents of embodiments of the present disclosure.

Unless otherwise defined, technical or scientific terms used in the present disclosure shall have ordinary meanings as understood by those skilled in the art. As used in the present disclosure, “first,” “second,” and similar terms do not denote any order, quantity, or importance, but are merely used to distinguish different components.

In addition, in the descriptions of embodiments of the present disclosure, the term “connected” or “connected to” may mean that two components are directly connected, or that two components are connected through one or more other components. In addition, the two components may be connected or coupled by wired or wireless means.

For an Advanced Super Dimension Switch (ADS) product, a multi-dimensional electric field is formed by an electric field generated between edges of a pixel electrode and an electric field generated between the pixel electrode and a common electrode, so that all oriented liquid crystal molecules may rotate between the pixel electrodes in a liquid crystal box and above the pixel electrode, so as to greatly improve a visual angle of a display screen. An inversion of the liquid crystal molecule may control a light transmission of backlight passing through the liquid crystal molecule, so that a sub-pixel corresponding to the liquid crystal molecule produces a corresponding brightness, and achieves a display of different gray scales.

In a process of the LCD display displaying a picture, applying a data signal with a changing polarity to the pixel electrode may avoid a polarization phenomenon of the liquid crystal molecule and improve an appearance of a residual shadow in the display screen. For example, a data signal with a polarity changing periodically between forward and negative directions is applied to the pixel electrode by using a common voltage Vcom applied by the common electrode as a reference voltage. Applying a forward data signal to the pixel electrode may be considered as a forward driving mode. At this time, a value of a voltage difference between a data signal voltage applied to the pixel electrode and the common voltage is positive. Applying a negative data signal to the pixel electrode may be considered as a negative driving mode. At this time, a value of a voltage difference between the data signal voltage applied to the pixel electrode and the common voltage is negative. In an ideal state, for a same gray scale, absolute values of difference values between the forward direction and the common voltage and between the negative direction and the common voltage are approximately equal to each other, so that brightnesses displayed in the forward direction and the negative direction of the same gray scale are the same.

Figure 1B:
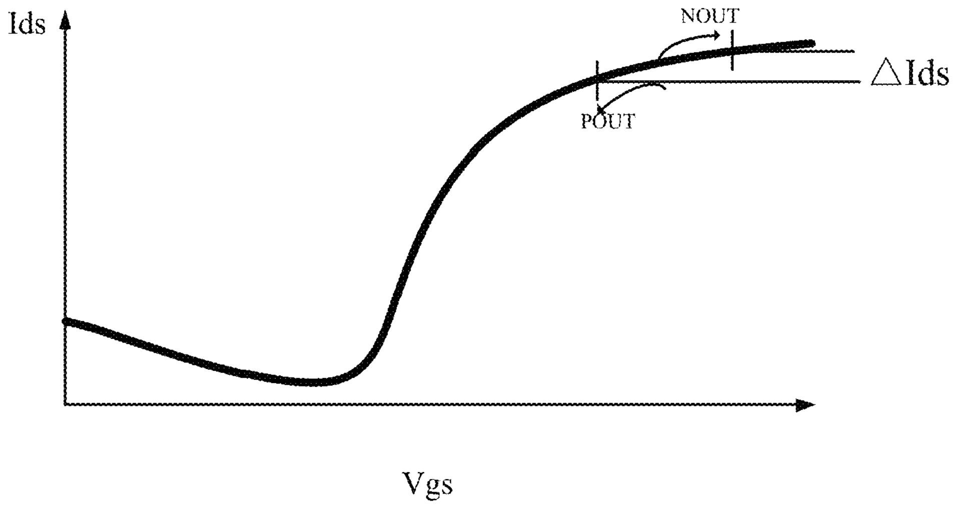
FIG. 1B shows a schematic diagram of an I-V characteristic curve of a transistor unit according to an example.
Figure 1C:
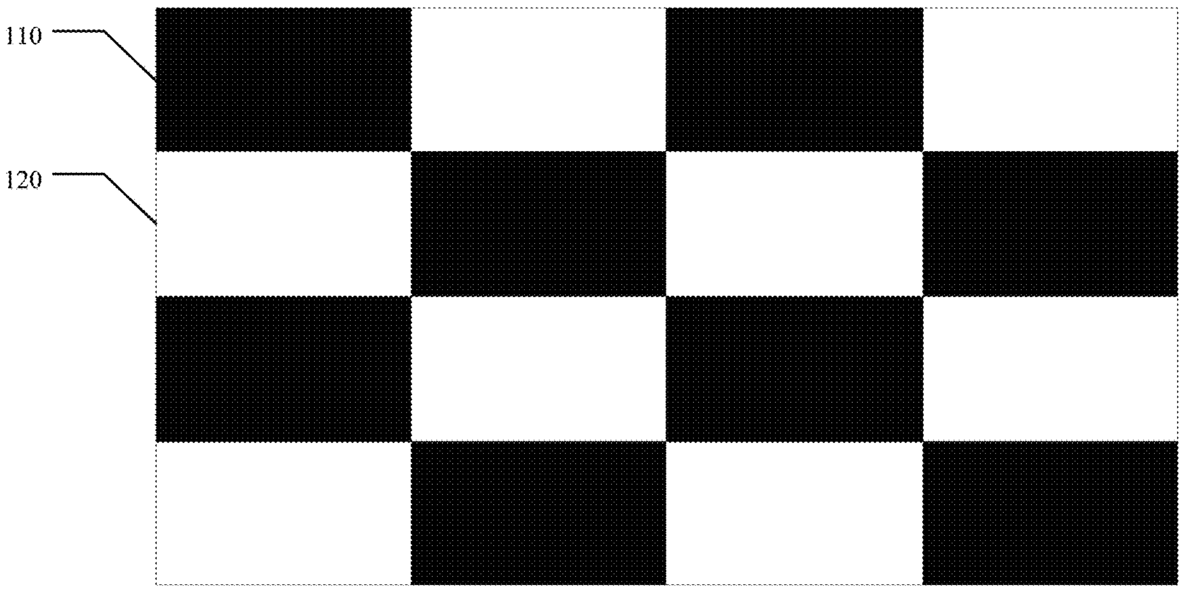
FIG. 1C shows a schematic diagram of a display screen of a black (L0)-and-white (L255) checkerboard according to an example.
Figure 1D:
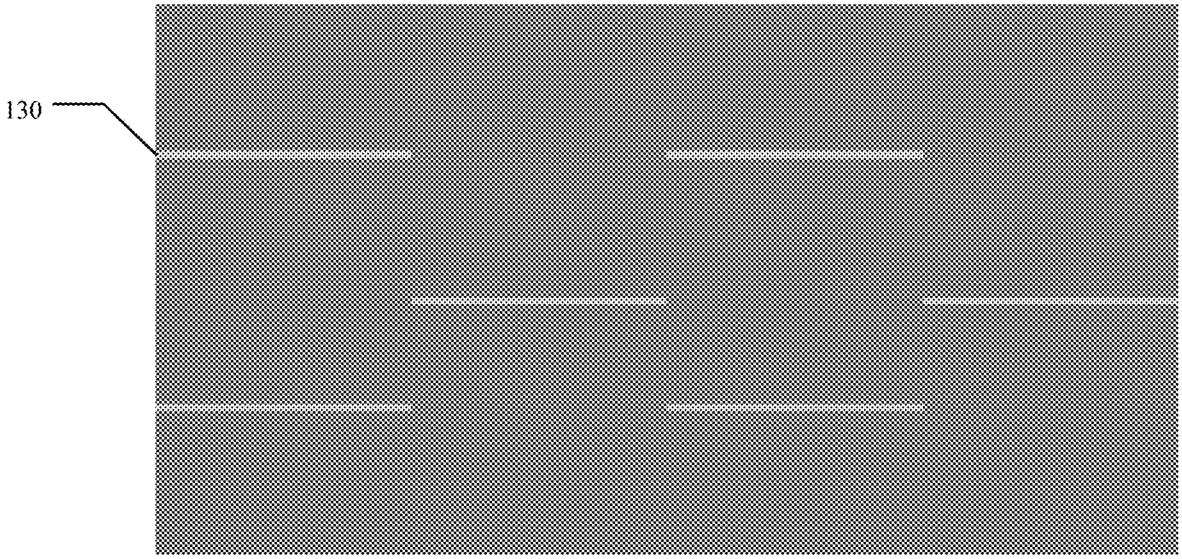
FIG. 1D shows a schematic diagram of an L127 gray scale picture abnormal display according to an example.
Figure 1E:
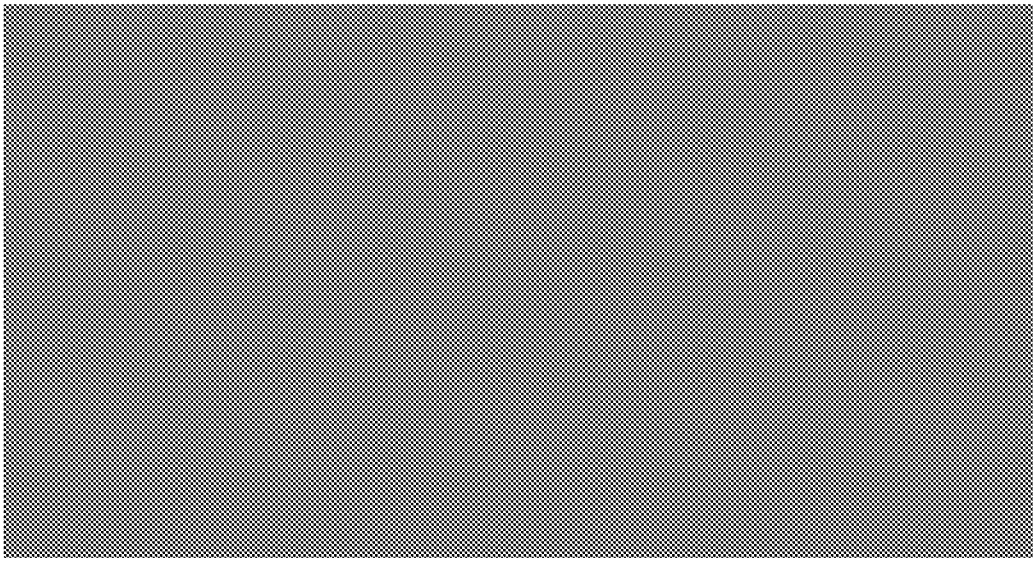
FIG. 1E shows a schematic diagram of an L127 gray scale picture normal display according to an example.

FIG. 1A shows a schematic diagram of a transistor unit according to an example, FIG. 1B shows a schematic diagram of an I-V characteristic curve of an exemplary transistor unit according to an example, FIG. 1C shows a schematic diagram of a display screen of a black (L0)-and-white (L255) checkerboard according to an example, FIG. 1D shows a schematic diagram of an L127 gray scale picture abnormal display according to an example, and FIG. 1E shows a schematic diagram of an L127 gray scale picture normal display according to an example.

As shown in FIG. 1A, a gate electrode of the transistor unit receives a gate driving signal, and a source electrode of the transistor unit receives a data signal. A pixel capacitor CS is charged by a gate source voltage Vgs between the gate electrode and the source electrode of the transistor unit. In some embodiments, as shown in FIG. 1B, according to an I-V transmission characteristic curve between a driving current Ids and the gate source voltage Vgs of a TFT unit, the gate source voltage Vgs under a negative driving NOUT is usually greater than the gate source voltage Vgs under a forward driving POUT. The greater a difference value between the gate source voltage Vgs under the negative driving NOUT and the gate source voltage Vgs under the forward driving POUT, the greater a driving current difference value ΔIds in two driving modes. The pixel capacitor CS under the negative driving has more charging charges than charging charges of the pixel capacitor CS under the forward driving, which may cause a charge accumulation at a boundary of the liquid crystal molecule and an appearance of a residual image.

As shown in FIG. 1C, the display displays a black-and-white checkerboard picture, a liquid crystal molecule 110 displays a black image (B), and a liquid crystal molecule 120 displays a white image (W). When an n-th frame picture is displayed, a sub-pixel corresponding to the liquid crystal molecule 110 is driven by a forward driving signal, and a sub-pixel corresponding to the liquid crystal molecule 120 is driven by a negative driving signal. When an (n+1)-th frame picture is displayed, a sub-pixel corresponding to the liquid crystal molecule 110 is driven by the negative driving signal, and a sub-pixel corresponding to the liquid crystal molecule 120 is driven by the forward driving signal.

When the checkerboard in the display screen changes from black to white, according to an I-V transmission characteristic of the TFT unit, a gate voltage Vg of the transistor is unchanged, and a source voltage Vs under a negative polarity is less than a source voltage Vs under a positive polarity. Because Vgs=Vg−Vs, a gate source voltage Vgs of the sub-pixel corresponding to the liquid crystal molecule under the negative driving is significantly greater than a gate source voltage Vgs of the sub-pixel corresponding to the liquid crystal molecule under the forward driving. For example, the gate voltage Vg is about 30 V, and the source power supply Vs is in a range of about 10 V to 20 V. The source voltage Vs is always less than the gate voltage Vg, and a value of the gate source voltage Vgs is always positive.

For products, such as a monitor display (MoNiTor), a television display (TeleVision), a notebook computer display (NoteBook), with a high refresh rate, a charging rate of the pixel capacitor CS when sub-pixels of the same row or column in a pixel array are driven in a negative direction (−B to −W) within a driving time is greater than a charging rate of the pixel capacitor CS when the sub-pixels of the same row or column in the pixel array are driven in a forward direction (+B to +W) within the driving time, and the pixel capacitor CS under the negative driving has more charging charges than the charging charges of the pixel capacitor CS under the forward driving. After a long-time display of a heavy-load picture (which belongs to a special display test picture, and generally refers to a display test of an LCD display screen in some extreme cases, such as a special test image under a certain specific pixel voltage reversal mode, such as a checkerboard picture), when a gray scale image is displayed, a charge accumulation at a boundary of some liquid crystal molecules under the heavy-load picture may be caused, a superimposed effect of accumulated charges may cause an increased pressure difference at both ends of the boundary, an actual brightness value at the boundary is greater than a target brightness value corresponding to the gray scale image at this time, so that a residual image may appear on the display screen.

The residual image usually refers to an image sticking. For example, when TFT-LCD displays a same picture for a long time, the liquid crystal molecule may not deflect normally under a control of a signal voltage due to a long-time drive. Even contents on the display screen are changed, a trace of a previous still image on the screen may be still seen. As shown in FIG. 1D, a residual image 130 is a residual image effect produced by the display panel after being driven by the checkerboard picture for a long time. An obvious checkerboard image sticking on an L127 gray scale picture may be clearly seen.

The inventors found that when a gate source voltage Vgs of the TFT unit in the liquid crystal molecule under the negative driving is similar to a gate source voltage Vgs of the TFT unit in the liquid crystal molecule under the forward driving, and the charging rate of the pixel capacitor CS under the negative driving is similar to the charging rate of the pixel capacitor CS under the forward driving, a normal display screen of the liquid crystal display is shown in FIG. 1E.

Various embodiments according to the present disclosure will be described below in detail with reference to the accompanying drawings. It should be noted that in the accompanying drawings, components that substantially have the same or similar structure and function may have the same reference numeral, and repeated descriptions of the components may be omitted.

Figure 2:
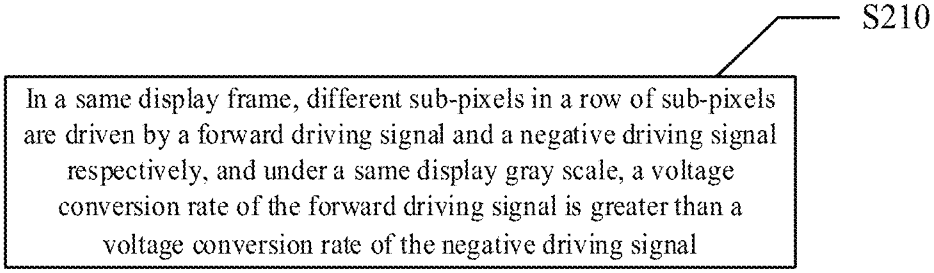
FIG. 2 shows a flowchart of a driving method of a display panel according to an embodiment of the present disclosure.

FIG. 2 shows a flowchart of a driving method of a display panel according to an embodiment of the present disclosure. The display panel includes a driving pixel array, and the pixel array includes a plurality of rows of sub-pixels.

As shown in FIG. 2, the driving method according to embodiments of the present disclosure may include the following steps. It should be noted that the sequence number of each step in the following method is only used as a representation of the step for description, and should not be regarded as representing an execution order of each step. Unless explicitly stated, the method does not need to be implemented in an order shown.

In step S210, in a same display frame, different sub-pixels in a row of sub-pixels are driven respectively by a forward driving signal and a negative driving signal, wherein a voltage conversion rate of the forward driving signal is greater than a voltage conversion rate of the negative driving signal under a same display gray scale.

For example, the voltage conversion rate may characterize a rate of completing a rising edge, or an amplitude of a voltage rise within the same time of the rising edge.

The voltage conversion rate may also characterize a rate at which the forward driving signal rises from a first voltage to a second voltage, or a rate at which the negative driving signal rises from a third voltage to a fourth voltage. A ratio between a voltage difference from the first voltage to a forward driving signal trough voltage and a voltage difference from a forward driving signal crest voltage to the forward driving signal trough voltage is in a range of 5% to 10%, and a ratio between a voltage difference from the second voltage to the forward driving signal trough voltage and the voltage difference from the forward driving signal crest voltage to the forward driving signal trough voltage is in a range of 90% to 95%. A ratio between a voltage difference from the third voltage to a negative driving signal trough voltage and a voltage difference from a negative driving signal crest voltage to the negative driving signal trough voltage is in a range of 5% to 10%, and a ratio between a voltage difference from the fourth voltage to the negative driving signal trough voltage and the voltage difference from the negative driving signal crest voltage to the negative driving signal trough voltage is in a range of 90% to 95%.

In embodiments of the present disclosure, under the same display gray scale, a rise time of the forward driving signal is less than a rise time of the negative driving signal. The rise time of the forward driving signal also characterizes a rise time required for the forward driving signal to rise from a first voltage to a second voltage, and the rise time of the negative driving signal also characterizes a rise time required for the negative driving signal to rise from a third voltage to a fourth voltage.

In embodiments of the present disclosure, under the same display gray scale, a fall time of the forward driving signal is greater than a fall time of the negative driving signal. The fall time of the forward driving signal characterizes a fall time required for the forward driving signal to fall from the second voltage to the first voltage, and the fall time of the negative driving signal characterizes a fall time required for the negative driving signal to fall from the fourth voltage to the third voltage.

For example, a voltage at a trough of the forward driving signal may be 10V, a voltage at a crest of the forward driving signal may be 20V, and a voltage difference between the forward driving signal crest voltage and the forward driving signal trough voltage is 10V. The rise time of the forward driving signal may characterize a time required for the forward driving signal to rise from 10.5V to 19.5V, and a corresponding fall time of the forward driving signal may characterize a time required for the forward driving signal to fall from 19.5V to 10.5V. Alternatively, the rise time of the forward driving signal may characterize a time required for the forward driving signal to rise from 11V to 19V, and a corresponding fall time of the forward driving signal may characterize a time required for the forward driving signal to fall from 19V to 11V. For example, a voltage at a trough of the negative driving signal may be 0V, a voltage at a crest of the negative driving signal may be 10V, and a voltage difference between the negative driving signal crest voltage and the negative driving signal trough voltage is 10V. The rise time of the negative driving signal may characterize a time required for the negative driving signal to rise from 0.5V to 9.5V, and a corresponding fall time of the negative driving signal may characterize a time required for the negative driving signal to fall from 9.5V to 0.5V. Alternatively, the rise time of the negative driving signal may characterize a time required for the negative driving signal to rise from 1V to 9V, and a corresponding fall time of the negative driving signal may characterize a time required for the negative driving signal to fall from 9V to 1V.

In embodiments of the present disclosure, under the same display gray scale, a ratio between the rise time of the forward driving signal and the rise time of the negative driving signal is in a range of 0.25 to 0.4. A ratio between the fall time of the forward driving signal and the fall time of the negative driving signal is in a range of 1.16 to 1.34.

For example, the shorter the rise time of the forward driving signal represents the faster the voltage conversion rate of the forward driving signal. Accordingly, the higher a charging efficiency of the pixel capacitor is driven by the forward driving signal.

A charging efficiency difference of the pixel capacitor in two driving modes may be improved by using the forward driving signal with a larger voltage conversion rate and the negative driving signal with a smaller voltage conversion rate. For example, when the ratio between the rise time of the forward driving signal and the rise time of the negative driving signal is less than 0.4, the charging efficiency difference of the pixel capacitor in the two driving modes may be improved.

In embodiments of the present disclosure, under the same display gray scale, a sum of the rise time of the forward driving signal and the fall time of the forward driving signal is less than a sum of the rise time of the negative driving signal and the fall time of the negative driving signal. A ratio between the sum of the rise time of the forward driving signal and the fall time of the forward driving signal and the sum of the rise time of the negative driving signal and the fall time of the negative driving signal is in a range of 0.61 to 0.78. The smaller the ratio is, the better an effect of improving the charging efficiency difference of the pixel capacitor in the two driving modes.

In embodiments of the present disclosure, under the same display gray scale, a forward driving gear of the forward driving signal is greater than a negative driving gear of the negative driving signal. The forward driving gear may characterize a rate at which the forward driving signal rises from the first voltage to the second voltage, and the negative driving gear may characterize a rate at which the negative driving signal rises from the third voltage to the fourth voltage.

For example, the forward driving gear may also characterize a fall time required for the forward driving signal to fall from the second voltage to the first voltage. The negative driving gear may also characterize a fall time required for the negative driving signal to fall from the fourth voltage to the third voltage.

A driving gear may represent a driving capability of the driving signal, and also represent a charging efficiency of the pixel capacitor under a driving of the driving signal. For example, the larger the driving gear, the greater the voltage conversion rate, and the higher a charging efficiency of a corresponding pixel capacitor.

For example, the forward driving gear and the negative driving gear may be set by a display device including the display panel according to embodiments of the present disclosure, or may be set before the display device leaves the factory.

In a conventional driving method, an initial driving gear of each of the forward driving signal and the negative driving signal may be considered as 100%. It should be noted that the initial driving gear of each of the forward driving signal and the negative driving signal being 100% is not to define that in an initial case, a charging efficiency of the pixel capacitor under a driving of the forward driving signal is equal to a charging efficiency of the pixel capacitor under a driving of the negative driving signal. The initial driving gear of the forward driving signal being 100% represents that the forward driving signal provides a 100% forward driving thrust for the pixel array, and the initial driving gear of the negative driving signal being 100% represents that the negative driving signal provides a 100% negative driving thrust for the pixel array. The 100% forward driving thrust and the 100% negative driving thrust may or may not be equal. Different driving gears may provide different thrusts for the liquid crystal molecule to provide pixel capacitors CSs with different charging levels.

In some embodiments, the 100% negative driving thrust is greater than the 100% forward driving thrust. Therefore, the forward driving gear of the forward driving signal may be increased, and the negative driving gear of the negative driving signal may be reduced, so that the voltage conversion rate of the forward driving signal is greater than the voltage conversion rate of the negative driving signal. Then, a charging rate of the pixel capacitor under the forward driving signal is the same as or similar to a charging rate of the pixel capacitor under the negative driving signal, so as to improve a problem of displaying a residual image.

In embodiments of the present disclosure, the forward driving signal and the negative driving signal may be provided with a same driving gear, or different driving gears. For example, the forward driving signal and the negative driving signal may have 8 identical and settable driving gears, respectively. For example, the eight settable driving gears of the forward driving signal and the negative driving signal are shown in Table 1.

TABLE 1

| | Driving gear | | | | | | | |
|---|---|---|---|---|---|---|---|---|
| | 1 | 2 | 3 | 4 | 4 | 5 | 6 | 7 |
| POP | 120% | 110% | 100% | 90% | 80% | 70% | 60% | 50% |
| NOP | 120% | 110% | 100% | 90% | 80% | 70% | 60% | 50% |

In embodiments of the present disclosure, eight forward driving gears of the forward driving signal may be 120%, 110%, 100%, 90%, 80%, 70%, 60% and 50%, respectively. Eight negative driving gears of the negative driving signal may be 120%, 110%, 100%, 90%, 80%, 70%, 60% and 50%, respectively. The forward driving gear set by the forward driving signal and the negative driving gear set by the negative driving signal may be the same or different.

For example, the forward driving gear and the negative driving gear are separately adjustable. When it is determined that a gate source voltage of the driving transistor under the forward driving is less than a gate source voltage of the driving transistor under the negative driving, a larger forward driving gear may be set separately to keep the negative driving gear unchanged; a larger forward driving gear and a smaller negative driving gear may be also set to adjust a charging level of the pixel capacitor CS.

Under the same display gray scale, both the rise time and the fall time of the driving signal may change under a driving of different driving gears. With a change in a ratio between the forward driving gear and the negative driving gear, the ratio between the rise time of the forward driving signal and the rise time of the negative driving signal and the ratio between the fall time of the forward driving signal and the fall time of the negative driving signal may also change. For example, under a driving of the forward driving gear and the negative driving gear listed in the above-mentioned embodiments, the ratio between the rise time of the forward driving signal and the rise time of the negative driving signal is in the range of 0.25 to 0.4, and the ratio between the fall time of the forward driving signal and the fall time of the negative driving signal is in the range of 1.16 to 1.34.

When the voltage conversion rate of the forward driving signal is greater than the voltage conversion rate of the negative driving signal, the pixel capacitor CS may have the same charging level under the forward driving and the negative driving, so as to avoid forming the charge accumulation at the boundary of the liquid crystal molecule after displaying the heavy-load picture and improve a problem of a line residual image in the display screen.

The present disclosure further provides a driving method of another embodiment.

In embodiments of the present disclosure, step S210 of driving different sub-pixels in a row of sub-pixels respectively by a forward driving signal and a negative driving signal includes: receiving, in a process of driving a row of sub-pixels, the forward driving signal and the negative driving signal respectively by sub-pixels adjacent to each other in a row direction.

For example, the forward driving signal and the negative driving signal are output to a column of sub-pixels of the pixel array through a first data line and a second data line, respectively. When it is determined that the pixel array includes 2N sub-pixel units, the display panel includes 2N data lines, the first data line includes N first data lines, and the second data line includes N second data lines, where N is a positive integer. Each data line is connected to a single column of sub-pixels of the pixel array, and the forward driving signal and/or the negative driving signal provide/provides a driving signal for the sub-pixel through the data line.

For example, data lines connected to two adjacent columns of sub-pixels may have different polarities. In the same display frame, for a single column of sub-pixels, each data line may alternately output the forward driving signal and the negative driving signal to the single column of sub-pixels of the pixel array, so that adjacent sub-pixels of the same column have different polarities. A polarity of a same sub-pixel of adjacent display frames is reversed once. For example, when the n-th frame picture is displayed, polarities of a first column of sub-pixels in the two adjacent columns of sub-pixels may be considered as positive, negative, positive, negative, positive, negative . . . , and polarities of a second column of sub-pixels in the two adjacent columns of sub-pixels may also be considered as negative, positive, negative, positive, negative, positive . . . . When the (n+1)-th frame picture is displayed, polarities of the first column of sub-pixels in the two adjacent columns of sub-pixels may be considered as negative, positive, negative, positive, negative, positive . . . , and polarities of the second column of sub-pixels in the two adjacent columns of sub-pixels may also be considered as positive, negative, positive, negative, positive, negative . . . .

For example, data lines connected to two adjacent columns of sub-pixels may have the same polarity. In the same display frame, for a first column of sub-pixels and a second column of sub-pixels that are adjacent to each other in the pixel array, driving signals input by two data lines connected to the first column of sub-pixels and the second column of sub-pixels have the same polarity. For a third column of sub-pixels and a fourth column of sub-pixels that are adjacent to each other in the pixel array, driving signals input by two data lines connected to the third column of sub-pixels and the fourth column of sub-pixels have the same polarity. Driving signals input by two data lines connected to the second column of sub-pixels and the third column of sub-pixels have opposite polarities. For a single column of sub-pixels, each data line may alternately output the forward driving signal and the negative driving signal to the single column of sub-pixel of the pixel array, so that adjacent sub-pixels of the same column have different polarities. A polarity of a same sub-pixel of adjacent display frames is reversed once. For example, when the n-th frame picture is displayed, polarities of the first column of sub-pixels and the second column of sub-pixels may be considered as positive, negative, positive, negative, positive, negative . . . , and polarities of the third column of sub-pixels and the fourth column of sub-pixels may be considered as negative, positive, negative, positive, positive . . . . When the (n+1)-th frame picture is displayed, polarities of the first column of sub-pixels and the second column of sub-pixels may be considered as negative, positive, negative, positive, negative, positive . . . , and polarities of the third column of sub-pixels and the fourth column of sub-pixels may be considered as positive, negative, positive, negative, positive, negative . . . .

The present disclosure further provides a driving method of another embodiment.

In embodiments of the present disclosure, in the same display frame, a same data line may receive only the forward driving signal or the negative driving signal.

For example, data lines connected to two adjacent columns of sub-pixels may have different polarities. In the same display frame, for two adjacent columns of sub-pixels, two adjacent data lines may output the forward driving signal and the negative driving signal to a single column of sub-pixels connected, respectively. For a single column of sub-pixels, a data line receives only the forward driving signal or the negative driving signal. A polarity of a same sub-pixel of adjacent display frames is reversed once. For example, when the n-th frame picture is displayed, polarities of the two adjacent columns of sub-pixels may be considered as positive, positive, positive, positive, positive . . . and negative, negative, negative, negative, negative, negative, negative . . . , respectively. When the (n+1)-th frame picture is displayed, polarities of the two adjacent columns of sub-pixels may be considered as negative, negative, negative, negative, negative . . . and positive, positive, positive, positive, positive, positive, positive . . . .

For example, data lines connected to two adjacent columns of sub-pixels may have the same polarity. In the same display frame, for a first column of sub-pixels and a second column of sub-pixels that are adjacent to each other in the pixel array, driving signals input by two data lines connected to the first column of sub-pixels and the second column of sub-pixels have the same polarity. For a third column of sub-pixels and a fourth column of sub-pixels that are adjacent to each other in the pixel array, driving signals input by two data lines connected to the third column of sub-pixels and the fourth column of sub-pixels have the same polarity. Driving signals input by two data lines connected to the second column of sub-pixels and the third column of sub-pixels have opposite polarities. For a single column of sub-pixels, a data line receives only the forward driving signal or the negative driving signal. A polarity of the same sub-pixel of adjacent display frames is reversed once. For example, when the n-th frame picture is displayed, polarities of the first column of sub-pixels and the second column of sub-pixels may be considered as positive, positive, positive, positive, positive . . . and positive, positive, positive, positive, positive . . . , and polarities of the third column of sub-pixels and the fourth column of sub-pixels may be considered as negative, negative, negative, negative, negative . . . and negative, negative, negative, negative, negative . . . . When the (n+1)-th frame picture is displayed, polarities of the first column of sub-pixels and the second column of sub-pixels may be considered as negative, negative, negative, negative, negative . . . and negative, negative, negative, negative, negative, negative . . . and polarities of the third column of sub-pixels and the fourth column of sub-pixels may be considered as positive, positive, positive, positive, positive . . . and positive, positive, positive, positive, positive . . . .

The present disclosure further provides an embodiment in which a driving capability of a driving signal is tested at different driving gears.

Figure 3:
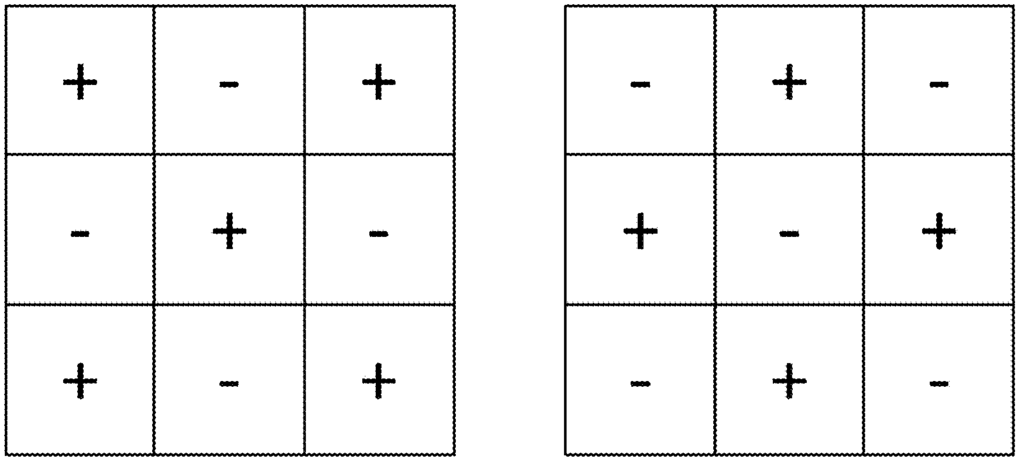
FIG. 3 shows a schematic diagram of a polarity of a sub-pixel in an exemplary pixel array.

FIG. 3 shows a schematic diagram of a polarity of a sub-pixel in an exemplary pixel array. As shown in FIG. 3, the forward driving signal is applied to a sub-pixel when an N-th frame picture is output, and the negative driving signal is applied to this sub-pixel when an (N+1)-th frame picture is output. The negative driving signal is applied to a sub-pixel when the N-th frame picture is output, and the forward driving signal is applied to this sub-pixel when the (N+1)-th frame picture is output. When the N-th frame picture is output, driving voltages of different polarities are applied to any two adjacent sub-pixels.

The pixel array shown in FIG. 3 is driven by the driving method according to any of the above-mentioned embodiments of the present disclosure, and driving signals output at different driving gears are tested. In an example, the forward driving gear tested includes 50% to 120%, and the negative driving gear tested includes 50% to 120%. Test results are shown in Table 2 and FIG. 4A to FIG. 4H. Table 2 shows parameters of driving signals at different driving gears, including: a rise time of the forward driving signal, a fall time of the forward driving signal, a rise time of the negative driving signal, a fall time of the negative driving signal, a ratio between the rise time of the forward driving signal and the rise time of the negative driving signal, a ratio between the fall time of the forward driving signal and the fall time of the negative driving signal, a sum of the rise time of the forward driving signal and the fall time of the forward driving signal, a sum of the rise time of the negative driving signal and the fall time of the negative driving signal, and a difference between sums of time of the forward driving signal and the negative driving signal. FIG. 4A to FIG. 4H show change curves of amplitudes of the forward driving signal and the negative driving signal with time, in which unit of the amplitude shown in the ordinate is volt, and unit of the time shown in the abscissa is nanosecond.

TABLE 2

| Driving mode | Gear | Rise time/ns | Fall time/ns | Sum of time/ns | Difference between sums of time/ns | Ratio between forward and negative rise times | Ratio between forward and negative fall times |
|---|---|---|---|---|---|---|---|
| 1 Forward | 100% | 298.0 | 705.7 | 1003.7 | −345.1 | 0.39 | 1.23 |
| Negative | 50% | 773.5 | 575.3 | 1348.8 | | | |
| 2 Forward | 100% | 263.7 | 677.4 | 941.1 | −359.3 | 0.33 | 1.32 |
| Negative | 60% | 787.8 | 512.6 | 1300.4 | | | |
| 3 Forward | 100% | 269.6 | 656.8 | 926.4 | −346.6 | 0.35 | 1.29 |
| Negative | 70% | 762.3 | 510.7 | 1273.0 | | | |
| 4 Forward | 100% | 301.9 | 693.3 | 995.2 | −279.2 | 0.40 | 1.34 |
| Negative | 80% | 757.5 | 516.9 | 1274.4 | | | |
| 5 Forward | 120% | 228.0 | 611.1 | 839.1 | −438.4 | 0.30 | 1.19 |
| Negative | 80% | 763.1 | 514.4 | 1277.5 | | | |
| 6 Forward | 120% | 213.9 | 620.3 | 834.2 | −538.2 | 0.25 | 1.16 |
| Negative | 50% | 839.9 | 620.3 | 1372.4 | | | |

Figure 4A:
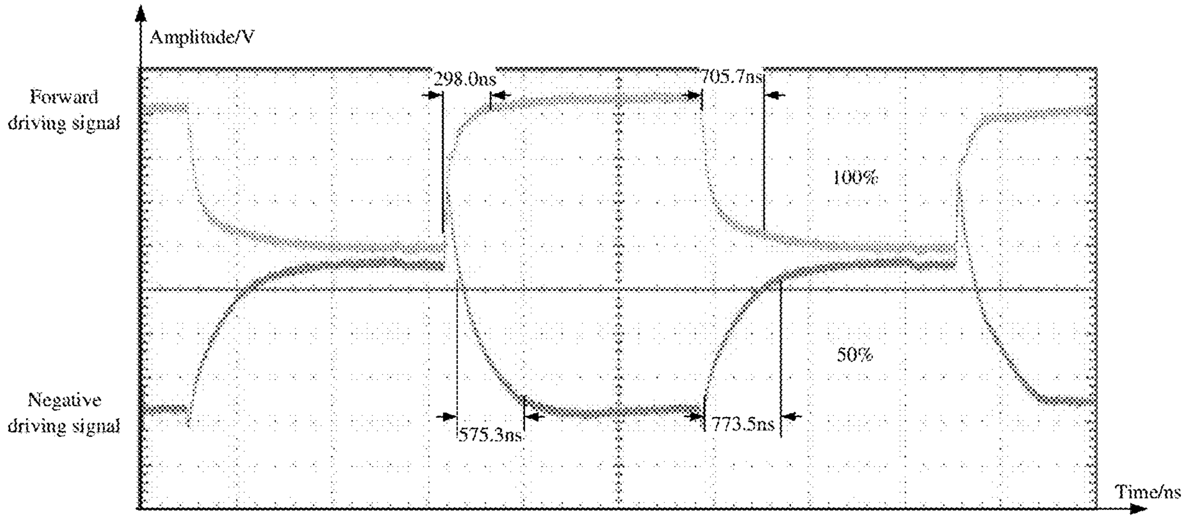
FIG. 4A shows a test waveform diagram according to an embodiment of the present disclosure.

As shown in Table 2 and FIG. 4A, the forward driving gear is 100% and the negative driving gear is 50%. An average rise time of the forward driving signal is 298.0 ns, and an average fall time of the forward driving signal is 705.7 ns. An average rise time of the negative driving signal is 773.5 ns, and an average fall time of the negative driving signal is 575.3 ns. A ratio between the rise time of the forward driving signal and the rise time of the negative driving signal is 0.39, and a ratio between the fall time of the forward driving signal and the fall time of the negative driving signal is 1.23. A sum of the rise time of the forward driving signal and the fall time of the forward driving signal is 1003.7 ns, and a sum of the rise time of the negative driving signal and the fall time of the negative driving signal is 1348.8 ns. A difference between the sums of time of the forward driving signal and the negative driving signal is −345.1 ns.

Figure 4B:
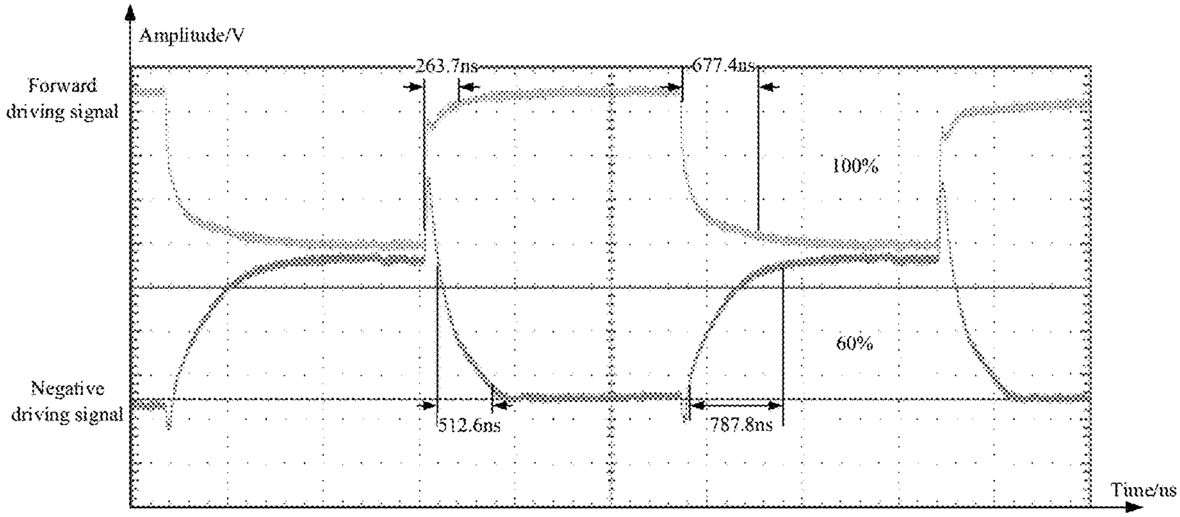
FIG. 4B shows a test waveform diagram according to another embodiment of the present disclosure.

As shown in Table 2 and FIG. 4B, the forward driving gear is 100% and the negative driving gear is 60%. An average rise time of the forward driving signal is 263.7 ns, and an average fall time of the forward driving signal is 667.4 ns. An average rise time of the negative driving signal is 787.8 ns, and an average fall time of the negative driving signal is 512.6 ns. A ratio between the rise time of the forward driving signal and the rise time of the negative driving signal is 0.33, and a ratio between the fall time of the forward driving signal and the fall time of the negative driving signal is 1.32. A sum of the rise time of the forward driving signal and the fall time of the forward driving signal is 941.1 ns, and a sum of the rise time of the negative driving signal and the fall time of the negative driving signal is 1300.4 ns. A difference between the sums of time of the forward driving signal and the negative driving signal is −359.3 ns.

Figure 4C:
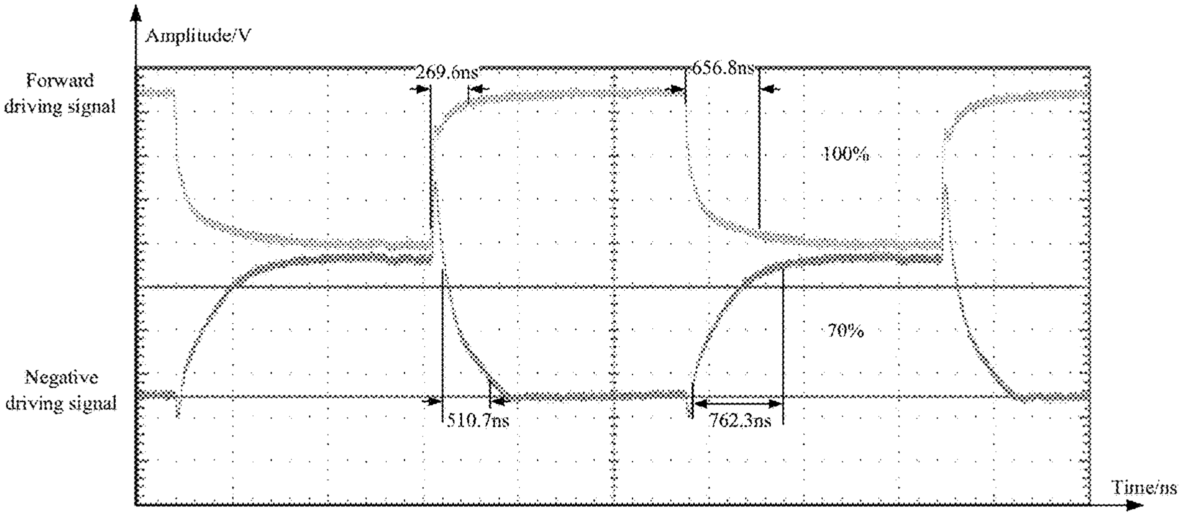
FIG. 4C shows a test waveform diagram according to another embodiment of the present disclosure.

As shown in Table 2 and FIG. 4C, the forward driving gear is 100% and the negative driving gear is 70%. An average rise time of the forward driving signal is 269.6 ns, and an average fall time of the forward driving signal is 656.8 ns. An average rise time of the negative driving signal is 762.3 ns, and an average fall time of the negative driving signal is 510.7 ns. A ratio between the rise time of the forward driving signal and the rise time of the negative driving signal is 0.35, and a ratio between the fall time of the forward driving signal and the fall time of the negative driving signal is 1.29. A sum of the rise time of the forward driving signal and the fall time of the forward driving signal is 926.4 ns, and a sum of the rise time of the negative driving signal and the fall time of the negative driving signal is 1273.0 ns. A difference between the sums of time of the forward driving signal and the negative driving signal is −346.6 ns.

Figure 4D:
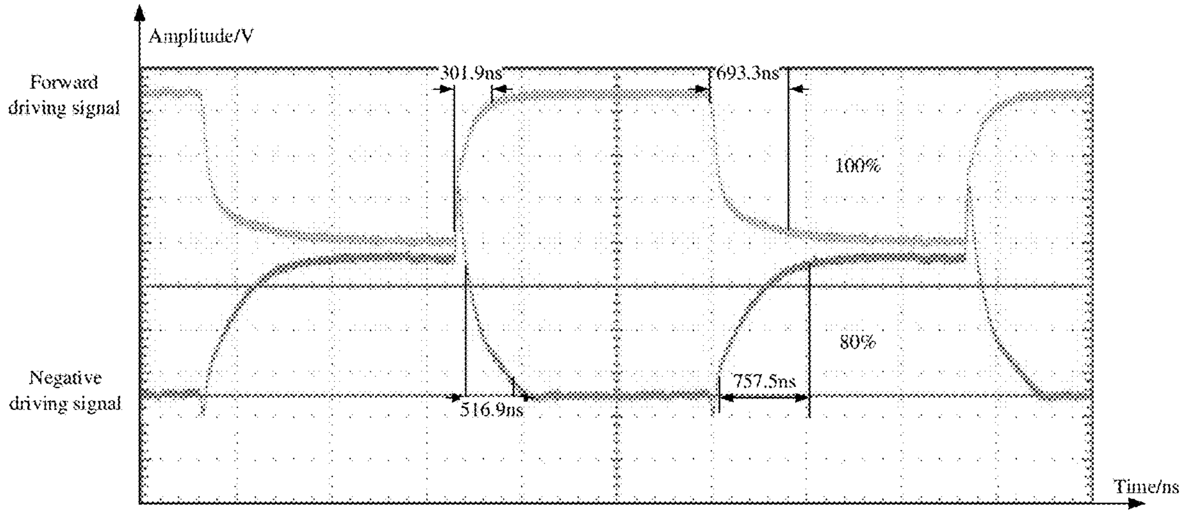
FIG. 4D shows a test waveform diagram according to another embodiment of the present disclosure.

As shown in Table 2 and FIG. 4D, the forward driving gear is 100% and the negative driving gear is 80%. An average rise time of the forward driving signal is 301.9 ns, and an average fall time of the forward driving signal is 693.3 ns. An average rise time of the negative driving signal is 757.5 ns, and an average fall time of the negative driving signal is 526.9 ns. A ratio between the rise time of the forward driving signal and the rise time of the negative driving signal is 0.40, and a ratio between the fall time of the forward driving signal and the fall time of the negative forward driving signal is 1.34. A sum of the rise time of the forward driving signal and the fall time of the forward driving signal is 995.2 ns, and a sum of the rise time of the negative driving signal and the fall time of the negative driving signal is 1274.4 ns. A difference between the sums of time of the forward driving signal and the negative driving signal is −279.2 ns.

Figure 4E:
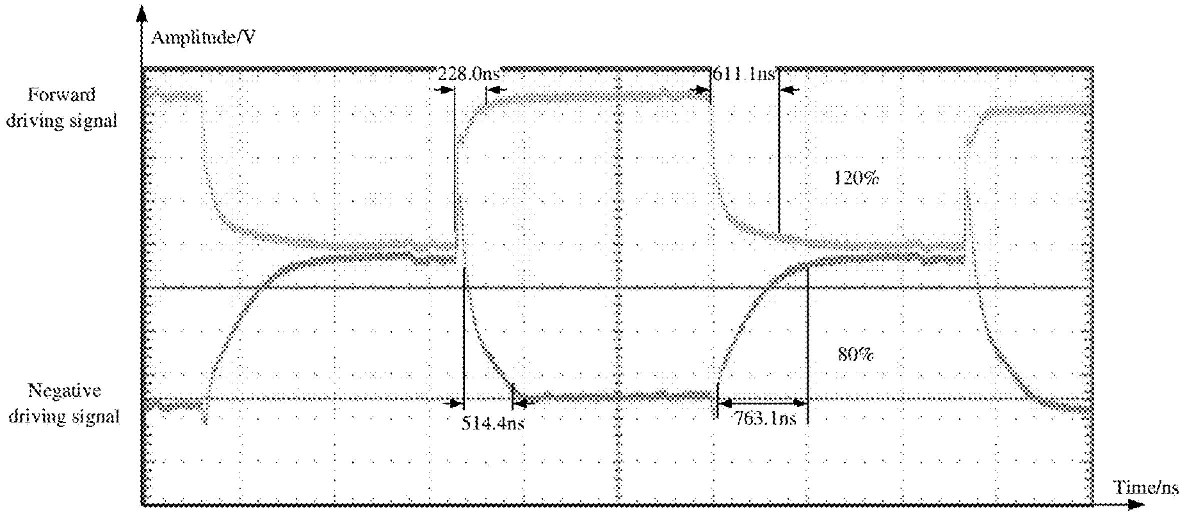
FIG. 4E shows a test waveform diagram according to another embodiment of the present disclosure.

As shown in Table 2 and FIG. 4E, the forward driving gear is 120% and the negative driving gear is 80%. An average rise time of the forward driving signal is 228.0 ns, and the average fall time of the forward driving signal is 611.1 ns. An average rise time of the negative driving signal is 763.1 ns, and an average fall time of the negative driving signal is 514.4 ns. A ratio between the rise time of the forward driving signal and the rise time of the negative driving signal is 0.30, and a ratio between the fall time of the forward driving signal and the fall time of the negative driving signal is 1.19. A sum of the rise time of the forward driving signal and the fall time of the forward driving signal is 839.1 ns, and a sum of the rise time of the negative driving signal and the fall time of the negative driving signal is 1277.5 ns. A difference between the sums of time of the forward driving signal and the negative driving signal is −438.4 ns.

Figure 4F:
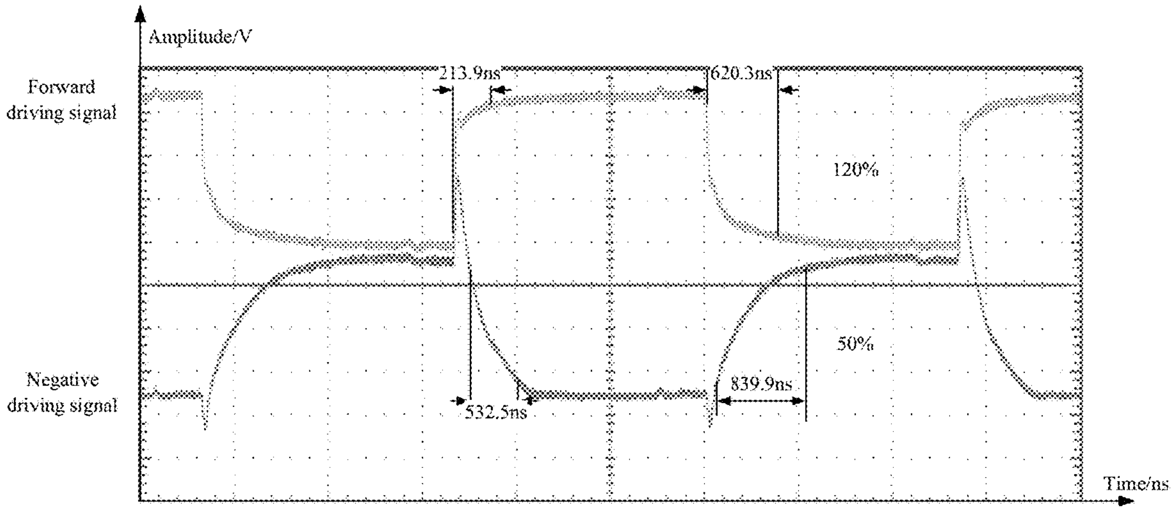
FIG. 4F shows a test waveform diagram according to another embodiment of the present disclosure.

As shown in Table 2 and FIG. 4F, the forward driving gear is 120% and the negative driving gear is 50%. An average rise time of the forward driving signal is 213.9 ns, and the average fall time of the forward driving signal is 620.3 ns. An average rise time of the negative driving signal is 839.9 ns, and the average fall time of the negative driving signal is 532.5 ns. A ratio between the rise time of the forward driving signal and the rise time of the negative driving signal is 0.25, and a ratio between the fall time of the forward driving signal and the fall time of the negative driving signal is 1.16. A sum of the rise time of the forward driving signal and the fall time of the forward driving signal is 834.2 ns, and a sum of the rise time of the negative driving signal and the fall time of the negative driving signal is 1372.4 ns. A difference between the sums of time of the forward driving signal and the negative driving signal is −538.2 ns.

Figure 4G:
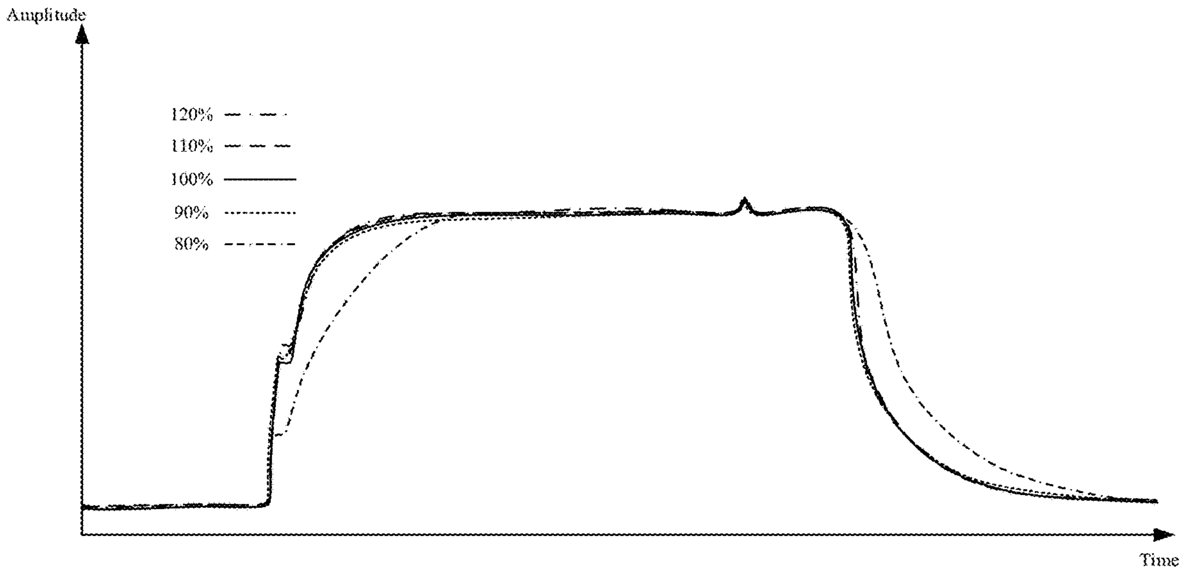
FIG. 4G shows a test waveform diagram of a forward driving signal according to another embodiment of the present disclosure.

As shown in FIG. 4G, when the forward driving gear is increased from 80% to 120%, an average rise time of the forward driving signal rising from the first voltage to the second voltage and an average fall time of the forward driving signal falling from the second voltage to the first voltage decrease gradually.

Figure 4H:
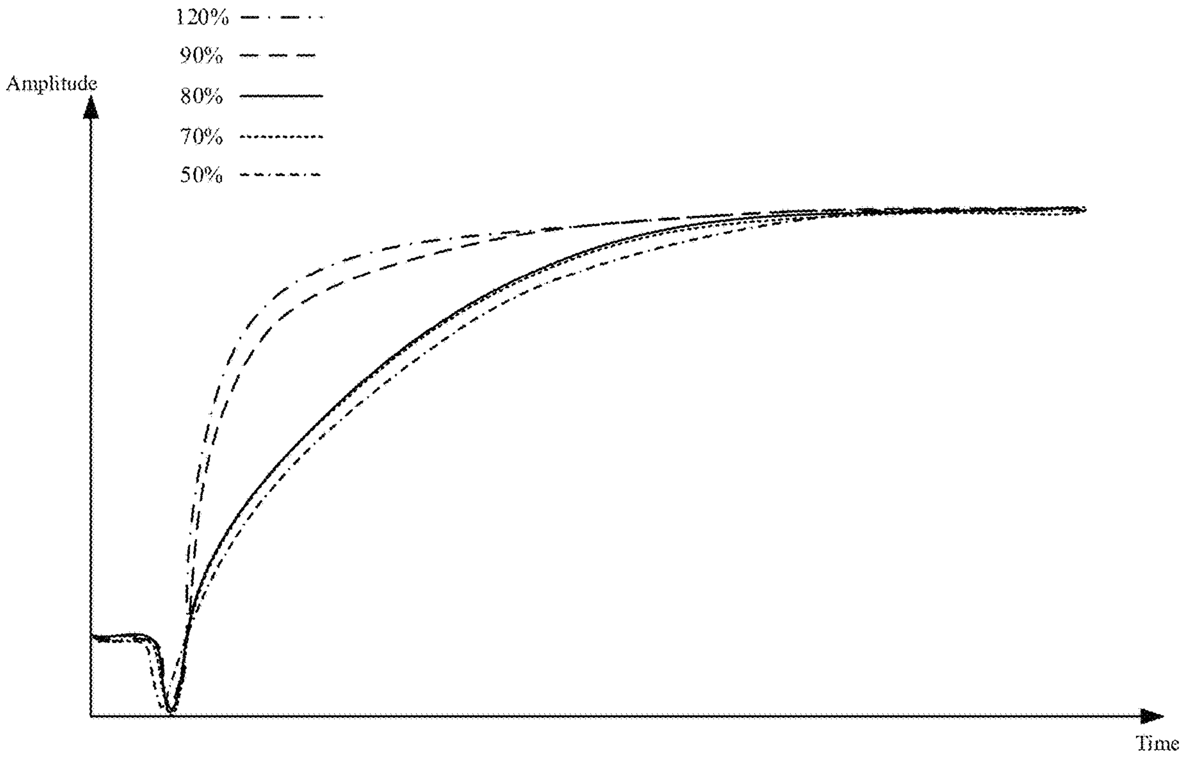
FIG. 4H shows a test waveform diagram of a negative driving signal according to another embodiment of the present disclosure.

As shown in FIG. 4H, when the negative driving gear is increased from 50% to 120%, an average rise time of the negative driving signal rising from the third voltage to the fourth voltage decreases gradually.

From the above test results, it can be seen that an influence of the driving signal on the charging level of the pixel capacitor is also different under the driving of different driving gears. When the forward driving gear is increased gradually, the rise time of the forward driving signal and the fall time of the forward driving signal decrease gradually. When the negative driving gear is increased gradually, the rise time of the negative driving signal and the fall time of the negative driving signal also decrease gradually. When the forward driving gear is 120% and the negative driving gear is 50%, the ratio between the rise time of the forward driving signal and the rise time of the negative driving signal is the smallest, and the ratio between the rise time of the forward driving signal and the rise time of the negative driving signal is the smallest. It may be considered that when the forward driving gear is 120% and the negative driving gear is 50%, driving capabilities of the forward driving signal and the negative driving signal have a largest difference.

For example, under a condition of a high frequency greater than or equal to 240 Hz, a charging difference may be easily generated between the forward driving and the negative driving due to too fast refresh frequency and short charging time. In some embodiments, a charging speed of the pixel capacitor under the negative driving is greater than a charging speed of the pixel capacitor under the forward driving. In the case, the forward driving gear may be increased and the negative driving gear may be reduced, so as to balance the charging efficiency difference of the pixel capacitor under the forward driving and the negative driving and avoid a generation of a residual image.

Figure 5:
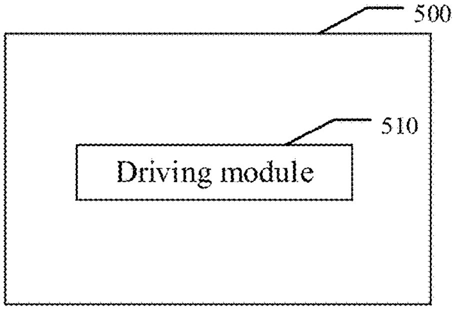
FIG. 5 shows a block diagram of a driving circuit for a display panel according to an embodiment of the present disclosure.

The present disclosure further provides a driving circuit for a display panel, which is used to drive a pixel array. The pixel array includes a plurality of sub-pixels. FIG. 5 shows a block diagram of a driving circuit according to an embodiment of the present disclosure. As shown in FIG. 5, a driving circuit 500 includes a driving sub-circuit 510. The driving sub-circuit 510 is used to drive, in the same display frame, different sub-pixels in a row of sub-pixels respectively by the forward driving signal and the negative driving signal, and the voltage conversion rate of the forward driving signal is greater than the voltage conversion rate of the negative driving signal.

For example, the driving sub-circuit 510 is used to perform operation S210 in the above-mentioned embodiments, which will not be repeated here.

Figure 6:
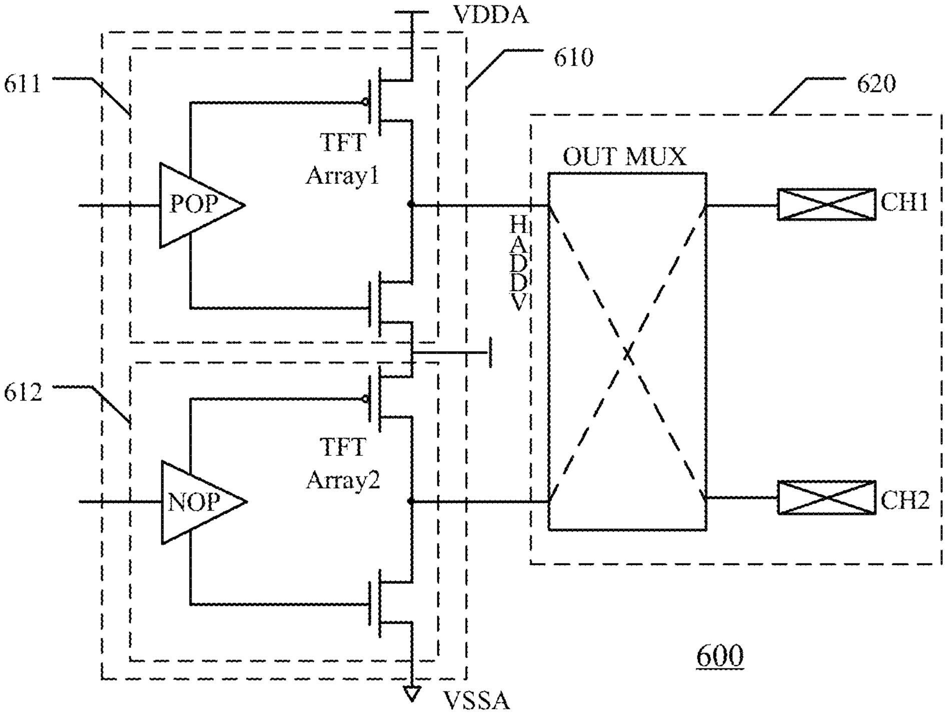
FIG. 6 shows a structural diagram of a driving circuit for a display panel according to an embodiment of the present disclosure.

FIG. 6 shows a structural diagram of a driving circuit for a display panel according to an embodiment of the present disclosure. The driving circuit is used to drive a pixel array, and the pixel array includes a plurality of rows of sub-pixels. As shown in FIG. 6, a driving circuit 600 for a display panel includes a driving signal generation sub-circuit 610 and a driving signal gating sub-circuit 620.

The driving signal generation sub-circuit 610 and the driving signal gating sub-circuit 620 may be provided on an array substrate, for example, directly produced by a composition process. The driving signal generation sub-circuit 610 and the driving signal gating sub-circuit 620 may further be provided inside an IC. For example, the IC is bound on the array substrate and provides a signal through a transmission path of terminal→lead→data line→sub-pixel electrode.

The driving signal generation sub-circuit 610 is used to generate a forward driving signal and a negative driving signal. The driving signal gating sub-circuit 620 is used to gate the forward driving signal and the negative driving signal, so that in a same display frame, the forward driving signal and the negative driving signal drive different sub-pixels in a row of sub-pixels, and a voltage conversion rate of the positive driving signal is greater than a voltage conversion rate of the negative driving signal.

In embodiments of the present disclosure, the rise time of the forward driving signal is less than the rise time of the negative driving signal. The rise time of the forward driving signal may characterize a rise time required for the forward driving signal to rise from the first voltage to the second voltage, and the rise time of the negative driving signal may characterize a rise time required for the negative driving signal to rise from the third voltage to the fourth voltage. A ratio between the rise time of the forward driving signal and the rise time of the negative driving signal is in a range of 0.25 to 0.4.

In embodiments of the present disclosure, the fall time of the forward driving signal is greater than the fall time of the negative driving signal. The fall time of the forward driving signal may characterize a fall time required for the forward driving signal to fall from the second voltage to the first voltage, and the fall time of the negative driving signal may characterize a fall time required for the negative driving signal to fall from the fourth voltage to the third voltage. A ratio between the fall time of the forward driving signal and the fall time of the negative driving signal is in a range of 1.16 to 1.34.

For example, a ratio between a voltage difference from the first voltage to a forward driving signal trough voltage and a voltage difference from a forward driving signal crest voltage to the forward driving signal trough voltage is in a range of 5% to 10%, and a ratio between a voltage difference from the second voltage to the forward driving signal trough voltage and the voltage difference from the forward driving signal crest voltage to the forward driving signal trough voltage is in a range of 90% to 95%. A ratio between a voltage difference from the third voltage to a negative driving signal trough voltage and a voltage difference from a negative driving signal crest voltage to the negative driving signal trough voltage is in a range of 5% to 10%, and a ratio between a voltage difference from the fourth voltage to the negative driving signal trough voltage and the voltage difference from the negative driving signal crest voltage to the negative driving signal trough voltage is in a range of 90% to 95%.

For example, a sum of the rise time of the forward driving signal and the fall time of the forward driving signal is less than a sum of the rise time of the negative driving signal and the fall time of the negative driving signal.

In embodiments of the present disclosure, a forward driving gear of the forward driving signal is greater than a negative driving gear of the negative driving signal. The forward driving gear may also characterize a rate at which the forward driving signal rises from the first voltage to the second voltage, and the negative driving gear may also characterize a rate at which the negative driving signal rises from the third voltage to the fourth voltage.

In embodiments of the present disclosure, the driving signal generation sub-circuit 610 includes a positive frame amplification unit 611 and a negative frame amplification unit 612.

The positive frame amplification unit 611 is electrically connected to a data signal end to receive a data signal from the data signal end, and outputs the forward driving signal. The negative frame amplification unit 612 is electrically connected to the data signal end to receive the data signal from the data signal end, and outputs the negative driving signal.

For example, a setting of a forward driving gear of a positive frame amplification sub-circuit and a negative driving gear of a negative frame amplification sub-circuit may be performed during a driving process of the driving circuit, or a setting of the forward driving gear of the positive frame amplification sub-circuit and the negative driving gear of the negative frame amplification sub-circuit may be performed before the display device leaves the factory.

For example, an input end of the driving signal gating sub-circuit 620 is electrically connected to the positive frame amplification unit 611 and the negative frame amplification unit 612, and an output end of the driving signal gating sub-circuit 620 is electrically connected to a data line of the display panel. The driving signal gating sub-circuit 620 may gate the forward driving signal and the negative driving signal, so that the forward driving signal and the negative driving signal drive the sub-pixels of the pixel array through the data line. The driving signal gating sub-circuit 620 includes an output multiplexer OUT MUX and two output ports CH1, CH2. The output multiplexer OUT MUX may gate the forward driving signal and the negative driving signal. The two output ports CH1, CH2 may be electrically connected to data lines of two adjacent columns of sub-pixels in the pixel array. The two output ports CH1, CH2 may also be electrically connected to data lines of two non-adjacent columns of sub-pixels in the pixel array so as to input a gating driving signal to a pixel unit.

The positive frame amplification unit 611 includes a positive frame operational amplifier POP and a transistor array TFT Array 1. The positive frame operational amplifier POP is electrically connected to the data signal end. The transistor array TFT Array 1 is electrically connected between an output end of the positive frame amplifier POP and the driving signal gating sub-circuit. The positive frame operational amplifier POP receives a data signal from the data signal end and controls the transistor array TFT Array 1 to generate the forward driving signal.

The negative frame amplification unit 612 includes a negative frame operational amplifier NOP and a transistor array TFT Array 2. An input end of the negative frame operational amplifier NOP is electrically connected to the data signal end. The transistor array TFT Array 2 is electrically connected between an output end of the negative frame amplifier NOP and the driving signal gating sub-circuit. The negative frame operational amplifier NOP receives the data signal from the data signal end and controls the transistor array TFT Array 2 to generate the negative driving signal.

The positive frame amplification unit 611 and the negative frame amplification unit 612 are respectively configured as amplification sub-circuits with individually adjustable driving gears. When the positive frame amplification unit 611 and the negative frame amplification unit 612 are set at different driving gears, the positive frame amplification unit 611 and the negative frame amplification unit 612 may provide different thrusts for the pixel array, so as to adjust the charging level of the pixel capacitor CS.

The present disclosure further provides a driving circuit of another embodiment. On the basis of the driving circuit 600 according to the above-mentioned embodiments, the driving circuit 600 further includes a first power supply VDDA, a second power supply VDDAH and a third power supply VSSA.

The first power supply VDDA is electrically connected to the transistor array TFT Array 1, and the first power supply VDDA outputs a first power supply voltage. The second power supply VDDAH is electrically connected to the transistor array TFT Array 2, and the second power supply VDDAH outputs a second power supply voltage. The first power supply voltage is 2 times of the second power supply voltage. For example, when the first power supply voltage is 10V, the second power supply voltage is 5V. The third power supply VSSA outputs a voltage of a ground terminal.

Two output ends of the positive frame amplifier POP are electrically connected to the first power supply VDDA and the second power supply signal end VDDAH, respectively. Two output ends of the negative frame amplifier NOP are connected to the second power supply VDDAH and the third power supply VSSA, respectively.

In embodiments of the present disclosure, the display panel includes 2N data lines, the pixel array includes 2N sub-pixels, the positive frame amplification unit includes N positive frame amplification units 611, the negative frame amplification unit includes N negative frame amplification units 612, and the driving signal gating sub-circuit includes N driving signal gating sub-circuits 620. Each driving signal gating sub-circuit 620 includes two input ends, which are electrically connected to the positive frame amplification unit 611 and the negative frame amplification unit 612, respectively. Each driving signal gating sub-circuit 620 includes two output ends, which are electrically connected to two adjacent data lines, respectively. The two output ends output the forward driving signal and the negative driving signal to drive connected data lines. In a process of driving a row of sub-pixels, the forward driving signal and the negative driving signal are respectively received by sub-pixels adjacent to each other in a row direction.

For example, the display panel includes 100 data lines, the pixel array includes 100 columns of sub-pixels, the positive frame amplification unit includes 50 positive frame amplification units 611, the negative frame amplification unit includes 50 negative frame amplification units 612, and the driving signal gating sub-circuit includes 50 driving signal gating sub-circuits 620. A positive frame amplification unit and a negative frame amplification unit constitute a group of amplification sub-circuits. A driving signal gating is performed on each group of amplification sub-circuits by a driving signal gating sub-circuit 620, and driving signals respectively gated through two output ends are input to the sub-pixel connected to the data line.

For example, when the N-th frame picture is output, the driving signal gating sub-circuit 620 outputs the forward driving signal from the port CH1 to a connected data line and outputs the negative driving signal from the port CH2 to a connected data line. When the (N+1)-th frame picture is output, the driving signal gating sub-circuit 620 outputs the negative driving signal from the port CH1 to the connected data line, and outputs the forward driving signal from the port CH2 to the connected data line.

For example, the driving signal gating sub-circuit 620 is used to output the forward driving signal and the negative driving signal to data lines connected to two adjacent columns of sub-pixels in the pixel array, respectively.

The present disclosure further provides an embodiment of a driving chip of a display panel.

The driving chip of the display panel is used to provide the forward driving signal and the negative driving signal to the display panel. The voltage conversion rate of the forward driving signal is greater than the voltage conversion rate of the negative driving signal.

The driving chip of the display panel is connected to a plurality of gate lines Gate to provide scanning signals to the plurality of gate lines Gate in sequence in a driving phase. The gate line Gate receives the scanning signal to turn on a TFT corresponding to the gate line Gate, so that a source electrode and a drain electrode of the TFT are conducted. A driving chip 800 is further connected to a plurality of data lines Data to write data voltages to the plurality of data lines Data respectively in the driving phase. The data voltage is input to a corresponding pixel electrode through the turned-on TFT.

The driving chip of the display panel is further used to generate a reference voltage. The reference voltage includes the first power supply voltage, the second power supply voltage and the third power supply voltage.

Figure 7:
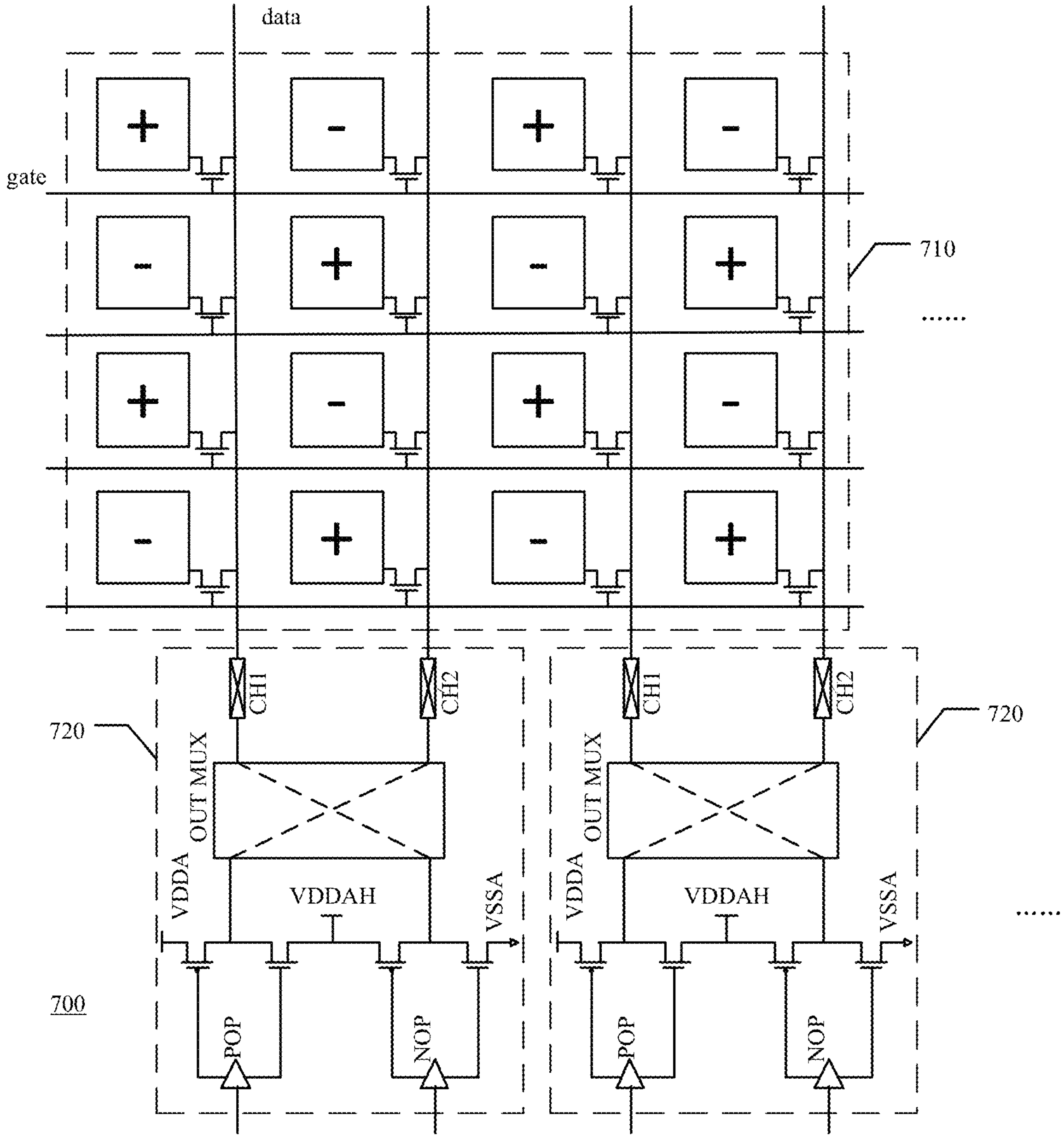
FIG. 7 shows a structural diagram of a display device according to an embodiment of the present disclosure.

FIG. 7 shows a structural diagram of a display device according to an embodiment of the present disclosure.

As shown in FIG. 7, a display device 700 includes a pixel array 710 and a driving circuit 720, and the pixel array 710 is electrically connected to the driving circuit 720. The driving circuit 720 includes the driving circuit 600 provided in corresponding embodiments of FIG. 6. In the same display frame, the driving circuit 720 alternately outputs the forward driving signal and the negative driving signal to the data line connected to the sub-pixel. In a process of driving a row of sub-pixels, the forward driving signal and the negative driving signal are respectively received by sub-pixels adjacent to each other in a row direction. The display device 700 further includes a plurality of data lines. The driving circuit includes a plurality of output ends, and the plurality of data lines are connected to the plurality of output ends, respectively.

The driving circuit 720 shown in FIG. 7 may be considered as a driving circuit including a group of amplification sub-circuits. Two output ends of the driving signal gating sub-circuit connected to a group of amplification sub-circuits are connected to data signal ends of two adjacent columns of sub-pixels in the pixel array 710, respectively. When the pixel array includes 2N columns of sub-pixels, 2N data lines are connected to the 2N columns of sub-pixels respectively, N driving circuits are connected to the 2N data lines, and each driving circuit includes a positive frame amplification unit and a negative frame amplification unit. The two output ends of the driving signal gating sub-circuit are electrically connected to data lines of the two adjacent columns of sub-pixels, respectively. When the driving gear of the forward driving signal and/or the negative driving signal is adjusted, a charging level of a corresponding connected pixel column may change accordingly.

For example, the rise time of the forward driving signal is less than the rise time of the negative driving signal. The rise time of the forward driving signal characterizes a rise time required for the forward driving signal to rise from the first voltage to the second voltage, and the rise time of the negative driving signal characterizes a rise time required for the negative driving signal to rise from the third voltage to the fourth voltage.

For example, a ratio between the rise time of the forward driving signal and the rise time of the negative driving signal is in a range of 0.25 to 0.4.

For example, the fall time of the forward driving signal is greater than the fall time of the negative driving signal. The fall time of the forward driving signal characterizes a fall time required for the forward driving signal to fall from the second voltage to the first voltage; the fall time of the negative driving signal characterizes a fall time required for the negative driving signal to fall from the fourth voltage to the third voltage.

For example, a ratio between the fall time of the forward driving signal and the fall time of the negative driving signal is in a range of 1.16 to 1.34.

For example, a ratio between a voltage difference from the first voltage to a forward driving signal trough voltage and a voltage difference from a forward driving signal crest voltage to the forward driving signal trough voltage is in a range of 5% to 10%, and a ratio between a voltage difference from the second voltage to the forward driving signal trough voltage and the voltage difference from the forward driving signal crest voltage to the forward driving signal trough voltage is in a range of 90% to 95%; and a ratio between a voltage difference from the third voltage to a negative driving signal trough voltage and a voltage difference from a negative driving signal crest voltage to the negative driving signal trough voltage is in a range of 5% to 10%, and a ratio between a voltage difference from the fourth voltage to the negative driving signal trough voltage and the voltage difference from the negative driving signal crest voltage to the negative driving signal trough voltage is in a range of 90% to 95%.

For example, a sum of the rise time of the forward driving signal and the fall time of the forward driving signal is less than a sum of the rise time of the negative driving signal and the fall time of the negative driving signal.

For example, a forward driving gear of the forward driving signal is greater than a negative driving gear of the negative driving signal. The forward driving gear characterizes a rate at which the forward driving signal rises from the first voltage to the second voltage, and the negative driving gear characterizes a rate at which the negative driving signal rises from the third voltage to the fourth voltage.

The flow diagrams and block diagrams in the accompanying drawings illustrate possibly implemented architectures, functions and operations of the systems, methods and computer program products according to various embodiments of the present disclosure. In this regard, each block in the flow diagrams or block diagrams may characterize a module sub-circuit, a program segment, or part of a code. The above-mentioned sub-circuit, program segment, or part of the code contains one or more executable instructions for realizing specified logic functions. It should also be noted that in some alternative implementations, functions marked in the blocks may also occur in a different order from those marked in the accompanying drawings. For example, two consecutive blocks may actually be performed in parallel, and sometimes they may be performed in a reverse order, which depends on the functions involved. It should also be noted that each block in the block diagrams or flow diagrams and a combination of blocks in the block diagrams or flow diagrams may be implemented by a dedicated hardware-based system that performs specified functions or operations, or by a combination of a dedicated hardware and computer instructions.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

Embodiments of the present disclosure have been described above. However, these embodiments are for illustrative purposes only, and are not used to limit the scope of the present disclosure. Although various embodiments have been described separately above, this does not mean that the measures in embodiments may not be used advantageously in combination. The scope of the present disclosure is defined by the appended claims and their equivalents. Without departing from the spirit and principles of the present disclosure, those skilled in the art may make various alternatives and equivalent substitutions, and these alternatives and modifications should all fall within the scope of the present disclosure.

What is claimed is:

1. A driving method of a display panel, the display panel comprising a pixel array, the pixel array comprising a plurality of rows of sub-pixels, and the driving method comprising:

driving, in a same display frame, different sub-pixels in a row of the sub-pixels respectively by a forward driving signal and a negative driving signal, wherein a voltage conversion rate of the forward driving signal is greater than a voltage conversion rate of the negative driving signal under a same display gray scale, wherein:

a rise time of the forward driving signal is less than a rise time of the negative driving signal;

the rise time of the forward driving signal characterizes a rise time required for the forward driving signal to rise from a first voltage to a second voltage; and the rise time of the negative driving signal characterizes a rise time required for the negative driving signal to rise from a third voltage to a fourth voltage, and wherein a ratio between the rise time of the forward driving signal and the rise time of the negative driving signal is in a range of 0.25 to 0.4.

2. The driving method according to claim 1, wherein:

a fall time of the forward driving signal is greater than a fall time of the negative driving signal;

the fall time of the forward driving signal characterizes a fall time required for the forward driving signal to fall from a second voltage to a first voltage; and the fall time of the negative driving signal characterizes a fall time required for the negative driving signal to fall from a fourth voltage to a third voltage.

3. The driving method according to claim 2, wherein a ratio between the fall time of the forward driving signal and the fall time of the negative driving signal is in a range of 1.16 to 1.34.

4. The driving method according to claim 2, wherein:

a ratio between a voltage difference from the first voltage to a forward driving signal trough voltage and a voltage difference from a forward driving signal crest voltage to the forward driving signal trough voltage is in a range of 5% to 10%, and a ratio between a voltage difference from the second voltage to the forward driving signal trough voltage and the voltage difference from the forward driving signal crest voltage to the forward driving signal trough voltage is in a range of 90% to 95%; and a ratio between a voltage difference from the third voltage to a negative driving signal trough voltage and a voltage difference from a negative driving signal crest voltage to the negative driving signal trough voltage is in a range of 5% to 10%, and a ratio between a voltage difference from the fourth voltage to the negative driving signal trough voltage and the voltage difference from the negative driving signal crest voltage to the negative driving signal trough voltage is in a range of 90% to 95%.

5. The driving method according to claim 1, wherein:

a ratio between a voltage difference from the first voltage to a forward driving signal trough voltage and a voltage difference from a forward driving signal crest voltage to the forward driving signal trough voltage is in a range of 5% to 10%, and a ratio between a voltage difference from the second voltage to the forward driving signal trough voltage and the voltage difference from the forward driving signal crest voltage to the forward driving signal trough voltage is in a range of 90% to 95%; and a ratio between a voltage difference from the third voltage to a negative driving signal trough voltage and a voltage difference from a negative driving signal crest voltage to the negative driving signal trough voltage is in a range of 5% to 10%, and a ratio between a voltage difference from the fourth voltage to the negative driving signal trough voltage and the voltage difference from the negative driving signal crest voltage to the negative driving signal trough voltage is in a range of 90% to 95%.

6. The driving method according to claim 5, wherein a sum of the rise time of the forward driving signal and a fall time of the forward driving signal is less than a sum of the rise time of the negative driving signal and a fall time of the negative driving signal.

7. The driving method according to claim 1, wherein the driving different sub-pixels in a row of the sub-pixels respectively by the forward driving signal and the negative driving signal comprises:

receiving, in a process of driving a row of the sub-pixels, the forward driving signal and the negative driving signal respectively by the sub-pixels adjacent to each other in a row direction.

8. The driving method according to claim 1, wherein the display panel further comprises a data line, and the forward driving signal and/or the negative driving signal provides a driving signal for the sub-pixel through the data line, and in a same display frame, a same data line receives only the forward driving signal or the negative driving signal.

9. The driving method according to claim 1, wherein:

a forward driving rate of the forward driving signal is greater than a negative driving rate of the negative driving signal;

the forward driving rate characterizes a rate at which the forward driving signal rises from a first voltage to a second voltage; and the negative driving rate characterizes a rate at which the negative driving signal rises from a third voltage to a fourth voltage.

10. A driving circuit of a display panel for performing the driving method according to claim 1, the driving circuit being configured to drive the pixel array, the pixel array comprising the plurality of sub-pixels, and the driving circuit comprising:

a driving signal generation sub-circuit configured to generate the forward driving signal and the negative driving signal; and a driving signal gating sub-circuit configured to gate the forward driving signal and the negative driving signal, so that in the same display frame, the forward driving signal and the negative driving signal respectively drive different sub-pixels in a row of the sub-pixels, and the voltage conversion rate of the forward driving signal is greater than the voltage conversion rate of the negative driving signal.

11. The driving circuit according to claim 10, wherein:

the display panel further comprises 2N data lines;

the driving signal gating sub-circuit comprises N driving signal gating sub-circuits, where N is a positive integer;

the driving signal gating sub-circuit comprises two output ends respectively electrically connected to two data lines; and the two output ends respectively output the forward driving signal and the negative driving signal, so as to drive sub-pixel units connected to the data lines.

12. The driving circuit according to claim 10, wherein the driving signal generation sub-circuit comprises:

a positive frame amplification unit electrically connected to a data signal end to receive a data signal from the data signal end, wherein the positive frame amplification unit is configured to output the forward driving signal; and a negative frame amplification unit electrically connected to the data signal end to receive a data signal from the data signal end, wherein the negative frame amplification unit is configured to output the negative driving signal.

13. The driving circuit according to claim 12, wherein the positive frame amplification unit comprises:

a positive frame operational amplifier electrically connected to the data signal end; and a first transistor array electrically connected between an output end of the positive frame amplifier and the driving signal gating sub-circuit.

14. The driving circuit according to claim 13, wherein the negative frame amplification unit comprises:

a negative frame operational amplifier having an input end electrically connected to the data signal end; and a second transistor array electrically connected between the output end of the positive frame amplifier and the driving signal gating sub-circuit.

15. The driving circuit according to claim 14, further comprising:

a first power supply electrically connected to the first transistor array and configured to output a first power supply voltage; and a second power supply electrically connected to the second transistor array and configured to output a second power supply voltage, wherein the first power supply voltage is 2 times of the second power supply voltage.

16. A display device, comprising:

the driving circuit according to claim 10; and the pixel array.

17. The display device according to claim 16, further comprising:

a plurality of data lines, wherein the driving circuit comprises a plurality of output ends, and the plurality of data lines are connected to the plurality of output ends, respectively.

18. A driving chip of the display panel for performing the driving method according to claim 1, wherein, the driving chip is configured to provide the forward driving signal and the negative driving signal to the display panel, and the voltage conversion rate of the forward driving signal is greater than the voltage conversion rate of the negative driving signal.

* * * * *